(12) United States Patent
Gronvall

(10) Patent No.: US 12,297,048 B2
(45) Date of Patent: May 13, 2025

(54) CONVEYOR SYSTEM UNIT AND ENDLESS CONVEYOR SYSTEM

(71) Applicant: METSO FINLAND OY, Espoo (FI)

(72) Inventor: Lars Gronvall, Trelleborg (SE)

(73) Assignee: Metso Finland Oy, Espoo (FI)

( * ) Notice: Subject to any disclaimer, the term of this patent is extended or adjusted under 35 U.S.C. 154(b) by 36 days.

(21) Appl. No.: 18/555,314

(22) PCT Filed: Feb. 17, 2022

(86) PCT No.: PCT/EP2022/053881
§ 371 (c)(1),
(2) Date: Oct. 13, 2023

(87) PCT Pub. No.: WO2022/223171
PCT Pub. Date: Oct. 27, 2022

(65) Prior Publication Data
US 2024/0190661 A1 Jun. 13, 2024

(30) Foreign Application Priority Data
Apr. 22, 2021 (EP) .................................... 21169906

(51) Int. Cl.
*B65G 17/06* (2006.01)
*B65G 17/34* (2006.01)
*B65G 17/42* (2006.01)

(52) U.S. Cl.
CPC ........... *B65G 17/067* (2013.01); *B65G 17/34* (2013.01); *B65G 17/42* (2013.01)

(58) Field of Classification Search
CPC ....... B65G 17/067; B65G 17/34; B65G 17/42
(Continued)

(56) References Cited

U.S. PATENT DOCUMENTS 1,852,664 A * 4/1932 McCann .............. B65G 17/067
 198/850
2,428,507 A 10/1947 Webb
(Continued)

FOREIGN PATENT DOCUMENTS

AU 2010200824 B2 10/2016
CA 3116134 A1 5/2020
(Continued)

OTHER PUBLICATIONS

International Search Report and Written Opinion for International Application No. PCT/EP2022/053881, mailed Jun. 22, 2022.
(Continued)

*Primary Examiner* — Mark A Deuble
(74) *Attorney, Agent, or Firm* — Andrus Intellectual Property Law, LLP

(57) ABSTRACT

A conveyor system unit configured to form part of an endless conveyor system. A conveyor system unit includes a first slat and a second slat, and each slat has a supporting surface with a first and a second long side edge portion and two short side edge portions. The first and second slats are arranged side by side in view of each other and are interconnected by an elastomeric matrix extending across the supporting surfaces. Each conveyor system unit further includes supporting side walls arranged at each short side edge portion of each slat, and the supporting side walls arranged on a same short edge side of the conveyor system unit are interconnected by an elastomeric matrix wall extending across the supporting side walls. An endless conveyor system including such conveyor system units can be constructed.

15 Claims, 16 Drawing Sheets

(58) Field of Classification Search
USPC .......................................... 198/850, 820, 822
See application file for complete search history.

(56) References Cited

U.S. PATENT DOCUMENTS

| | | | | | |
|---|---|---|---|---|---|
| 3,349,893 | A | * | 10/1967 | Friedrich | B65G 17/086 198/850 |
| 3,603,447 | A | * | 9/1971 | Pott | B65G 17/126 198/711 |
| 3,750,864 | A | * | 8/1973 | Nolte | B65G 15/42 198/713 |
| 4,177,891 | A | | 12/1979 | Delfosse | |
| 4,682,686 | A | * | 7/1987 | Ueda | B65G 17/34 411/546 |
| 5,509,526 | A | * | 4/1996 | Bonnet | B65G 17/345 198/850 |
| 5,549,195 | A | * | 8/1996 | Aulagner | B65G 17/067 482/37 |
| 5,660,266 | A | | 8/1997 | Nolte | |
| 5,921,378 | A | * | 7/1999 | Bonnet | B65G 17/08 198/850 |
| 5,975,283 | A | * | 11/1999 | Riffe | B65G 15/42 198/550.11 |
| 6,571,935 | B1 | * | 6/2003 | Campbell | B65G 15/42 198/821 |
| 7,182,202 | B2 | * | 2/2007 | Kalverkamp | B65G 17/02 198/848 |
| 7,757,841 | B2 | * | 7/2010 | Fandella | F16G 3/10 198/844.2 |
| 8,020,706 | B2 | * | 9/2011 | Hendrickson | B07B 13/003 198/861.5 |

FOREIGN PATENT DOCUMENTS

| | | |
|---|---|---|
| DE | 1123619 B | 2/1962 |
| GB | 854646 A | 11/1960 |
| GB | 1285948 A | 8/1972 |

OTHER PUBLICATIONS

Extended European Search Report for European Application No. 21169906.1, mailed Oct. 5, 2021.

* cited by examiner

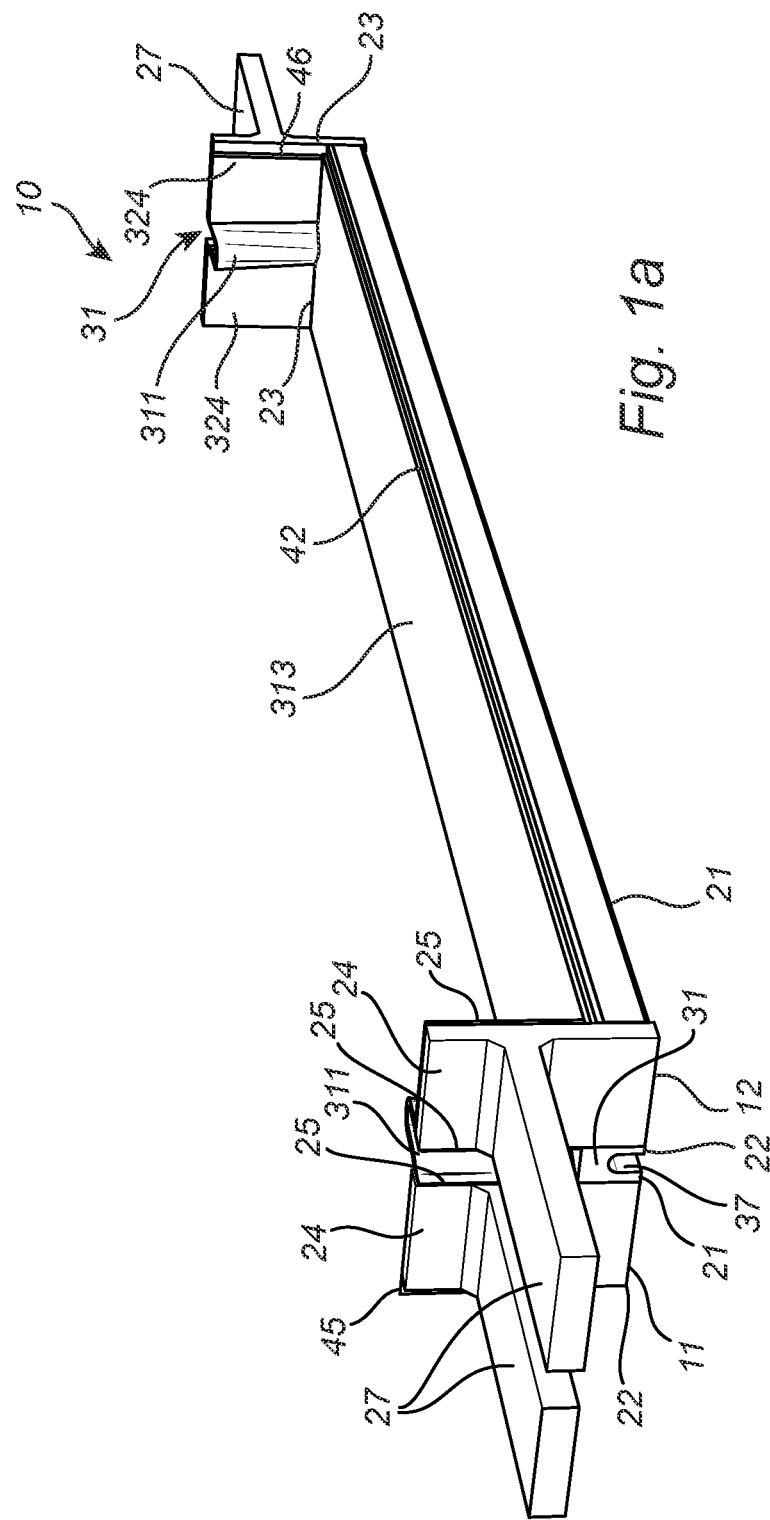

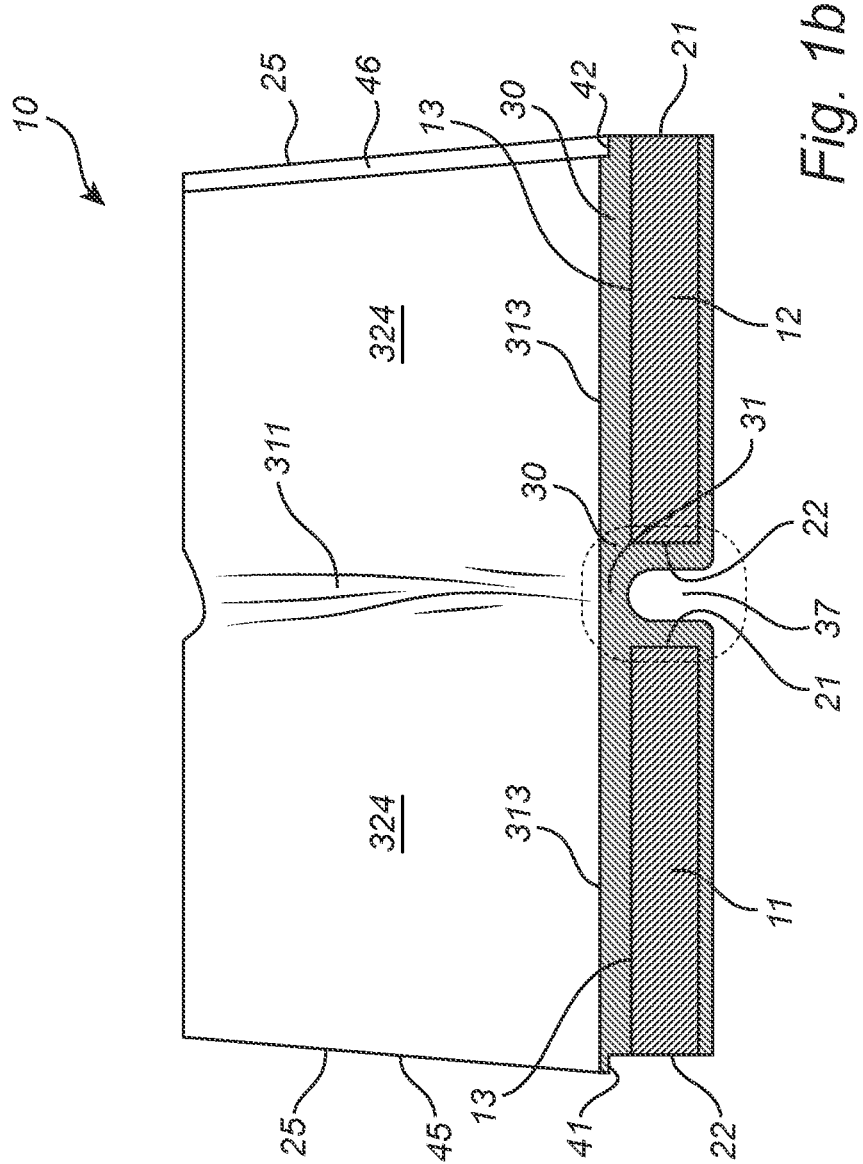

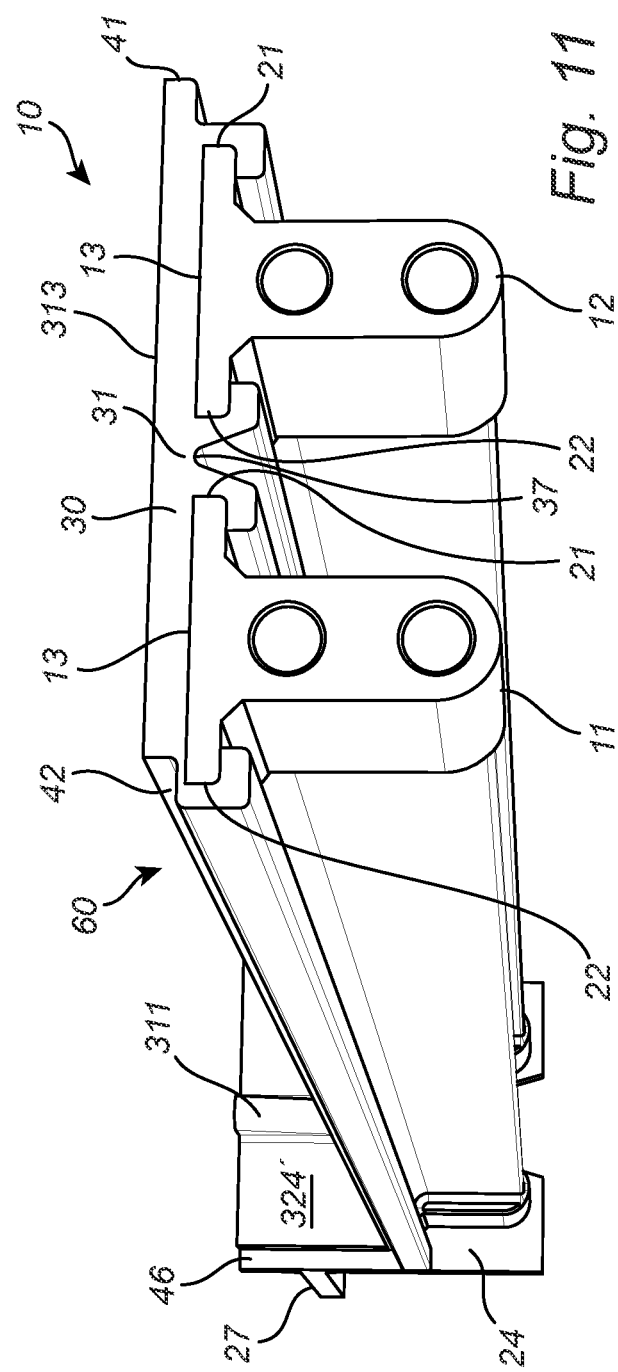

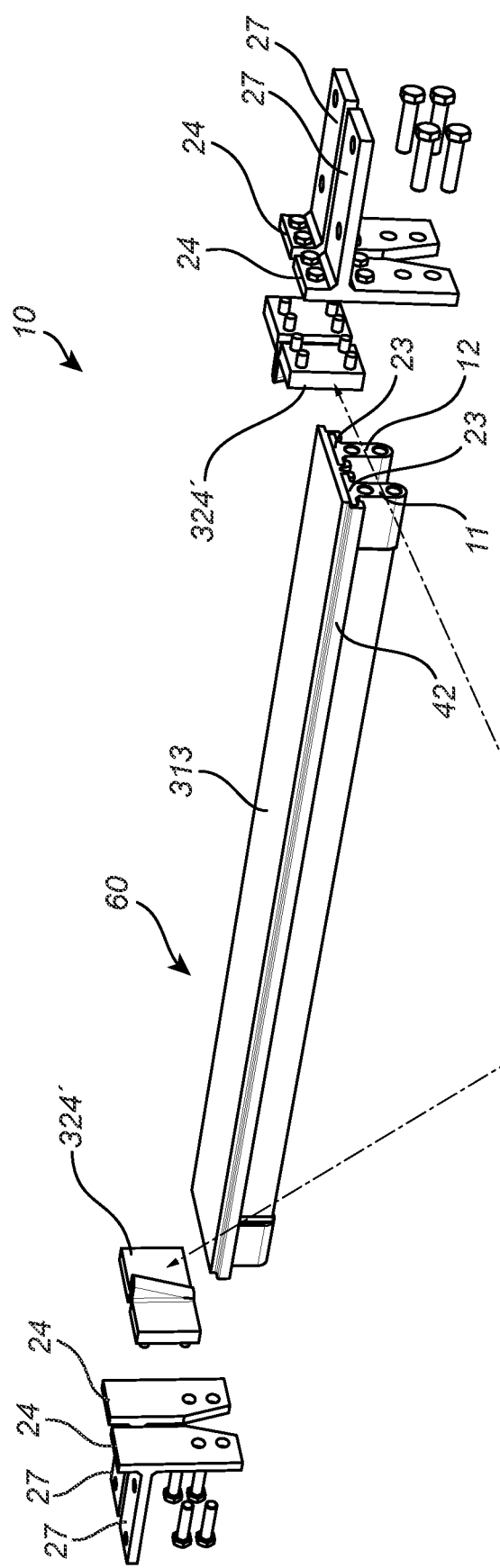
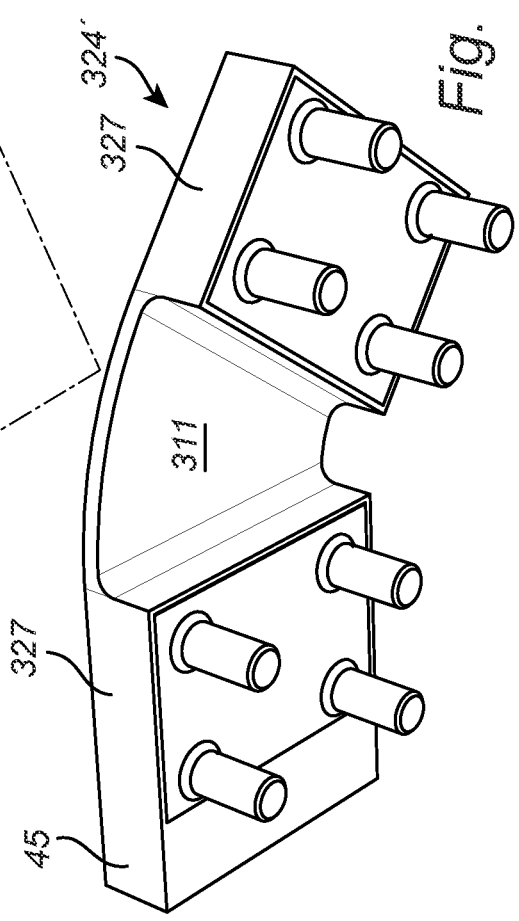

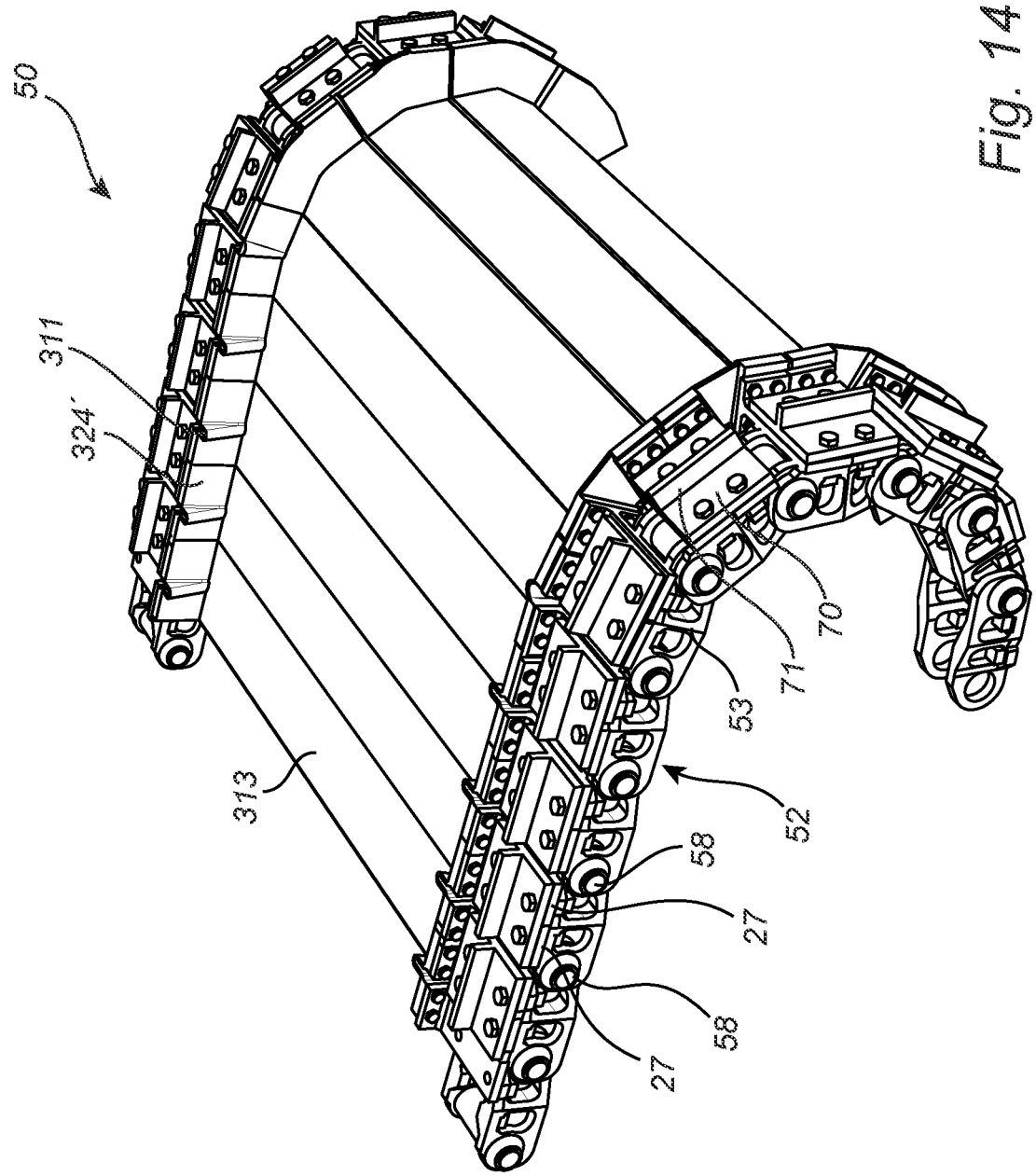

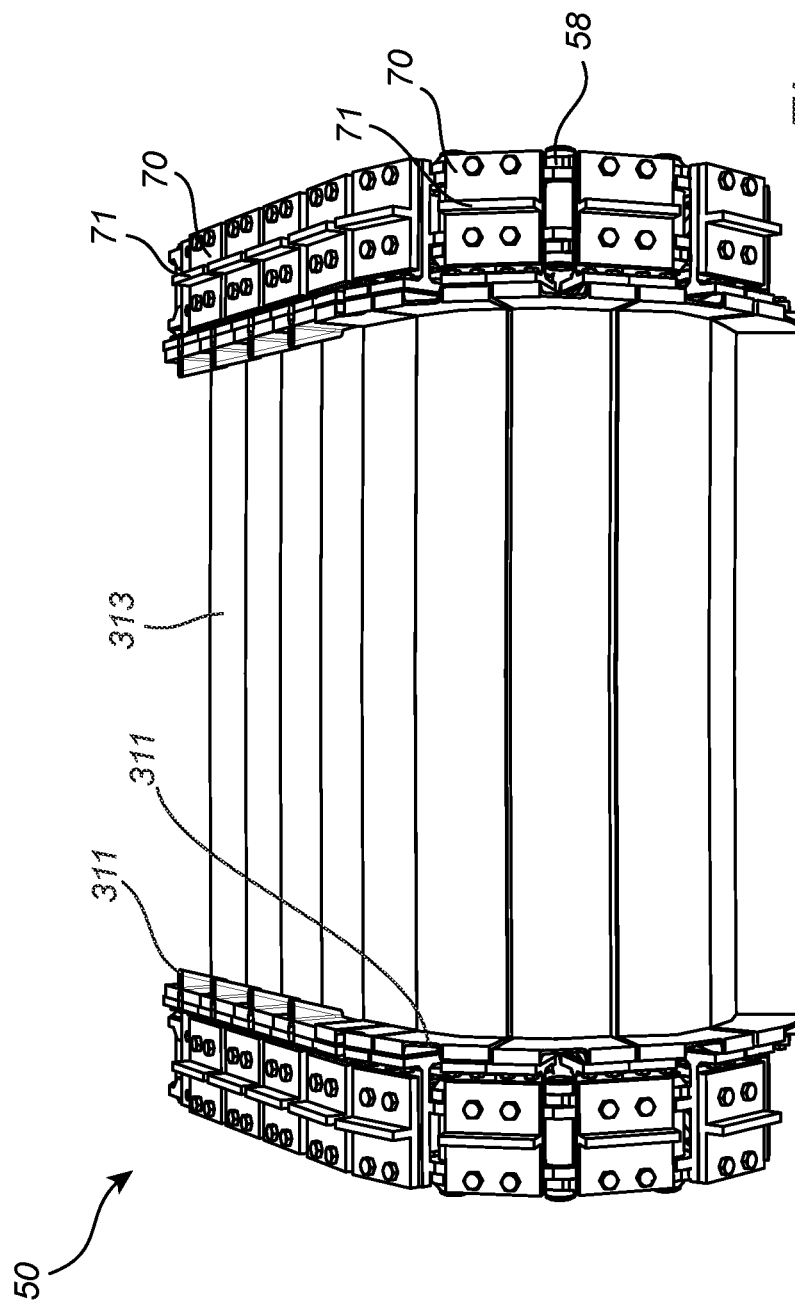

CONVEYOR SYSTEM UNIT AND ENDLESS CONVEYOR SYSTEM

CROSS-REFERENCE TO RELATED APPLICATIONS

This application is the U.S. national stage application of International Application PCT/EP2022/053881, filed Feb. 17, 2022, which international application was published on Oct. 27, 2022, as International Publication WO 2022/223171 A1 in the English language. The International Application claims priority European Patent Application No. 21169906.1 filed Apr. 22, 2021.

FIELD OF THE DISCLOSURE

The present disclosure relates to a conveyor system unit configured to form part of an endless conveyor system as well as to an endless conveyor system comprising a pair of endless chains and a plurality of the conveyor system units.

BACKGROUND

Within the mining industry there are different feeder options available for transporting mining material from one equipment type to another. For heavy duty applications apron feeders are often used. The apron feeders include steel feeder pans that are supported and driven by track chains. Where significant fines are present and/or height of transfer is critical, a belt feeder might be a better choice.

Conveyor belt feeders connected to steel supporting crossbars driven by track chains are also known, and when used for transporting ore material, such an arrangement can prevent leakage of fine material or possible liquid through the conveying surface. However, the belt surface of conveyer belt feeders wears and can become ripped or punctured by larger rocks, and replacement of a worn belt can be time consuming and difficult.

SUMMARY

An object of the disclosure is to provide an improved conveyor system unit and an improved endless conveyor system comprising a plurality of such conveyor system units.

According to a first aspect of the disclosure, these and other objects are achieved, in full or at least in part, by a conveyor system unit configured to form part of an endless conveyor system. According to this aspect of the disclosure, each conveyor system unit comprises a first slat and a second slat together forming a pair of slats, each slat having a supporting surface with a first and a second long side edge portion and two short side edge portions. The first and second long side edge portions are longer than the two short side edge portions, and the first and second long side edge portions and the two short side edge portions together define a rectangular supporting surface. The first and second slats are arranged side by side in view of each other with a first long side edge portion of the first slat facing a second long side edge portion of the second slat. Further the first and second slats are interconnected by an elastomeric matrix extending across the supporting surfaces of the first and second slats. Further, the elastomeric matrix comprises a connecting portion extending between the first and second slats thereby forming a continuous carrying surface of the conveyor system unit, wherein the connecting portion forms a hinged connection between the first and second slats, and wherein the elastomeric matrix is fastened to the first and second slats.

Each conveyor system unit further comprises supporting side walls arranged at each short side edge portion of each slat, which supporting side walls extend upwards above the supporting surfaces of each slat. The supporting side walls arranged on a same short edge side of the conveyor system unit are interconnected by an elastomeric matrix wall fastened to and extending across the supporting side walls. The elastomeric matrix wall further comprises a connecting wall portion extending between the supporting side walls arranged on the same short edge side of the conveyor system unit, thereby forming a continuous side wall at each short edge side of the conveyor system unit, wherein the connecting wall portions form a hinged connection between the supporting side walls at each short edge side of the conveyor system unit.

With such conveyor system units, individual conveyor system units may be replaced independently of each other upon rupture, wear, or other affects, like chemical contamination. With the possibility of independent replacement, the down time for the conveyor system during exchange is reduced. Further, these conveyor system units, when arranged into an endless conveyor system, enables use of scrapers also for the side walls, and not only for the continuous carrying surface of the endless conveyor system.

According to an embodiment, each side wall has a support member, and the conveyor system unit is configured to be mounted to a pair of endless chains by a support member of a supporting side wall on the first slat connecting to a first chain link and a support member of a supporting side wall on the second slat connecting to a consecutive chain link in the endless chain. Thus, each conveyor system unit is configured to be arranged to bridge over a pivotable joint in the chain link, and the connecting portion between the pair of slats and the connecting wall portion between the supporting side walls allow such pivot movement when the endless conveyor system travels over one of the pulley positions. Thus, the support members are arranged on a side of the supporting side walls opposite to the elastomeric matrix walls.

According to one embodiment, the connecting wall portion is foldable and wedge shaped with an acute angle facing the continuous carrying surface. When a plurality of conveyor system units are arranged into an endless conveyor system, the wedge shaped connecting wall portion will, between the pulley positions, be folded together between the supporting side walls of the first and second slats, and will, when traveling over the pulleys, be stretched between the supporting side walls of the first and second slat thereby forming a continuous flat side wall with the elastomeric matrix walls on the supporting side walls arranged on the same short edge side of the conveyor system unit.

According to another embodiment, the connecting portion between the long side edge portions of the first and second slats comprises a longitudinally extending recess, the longitudinally extending recess forming part of the hinged connection between the first and second slats and side walls. When a plurality of conveyor system unit is arranged into an endless conveyor system, the longitudinally extending recess in the connecting portion will, in pulley position, enable a pivotable movement between the first and second slat, wherein the elastomeric matrix will be compressed to some extent. Such a longitudinally extending recess may be arced formed or have a triangular cross-section. Other geometrical cross-sections are also possible, as long as the longitudinally extending recess allows the two slats to be pivotably moved in relation to each other when passing a pulley position. The longitudinally extending recess is preferably arranged in a surface opposite to the continuous carrying surface of the conveyor system unit. Having that said, in one embodiment the connecting portion has no longitudinally extending recess, instead the elastomeric matrix is made of a material flexible enough to allow bending in the connecting portion between the first and second slats.

According to one embodiment, the first slat has a longitudinally extending protruding web along a second long side edge portion, and the second slat has a corresponding longitudinally extending recess along a first long side edge portion. Thus, when a plurality of conveyor system units are arranged side by side into an endless conveyor system on a pair of endless chains, with each conveyor system unit bridging a pivotable joint in the chain link, and a consecutive conveyor system unit being arranged with a first slat connected to the same chain link as the second slat of the preceding conveyor system unit, the longitudinally extending protruding web of one conveyor system unit and corresponding longitudinally extending recess of adjacent conveyor system unit are aligned thereby forming a continuous carrying surface of the endless conveyor system.

In one embodiment, it is the elastomeric matrix, which has a longitudinally extending protruding web along a second long side edge portion of the first slat and a corresponding longitudinally extending recess along a first long side edge portion of the second slat.

In another embodiment, the longitudinally extending protruding web may be formed in the elastomeric matrix, while the corresponding longitudinally extending recess is formed by the supporting surface of the slat in combination with an end surface of the elastomeric matrix not covering the supporting surface fully along a first long side edge portion of the second slat.

Independently if the longitudinally extending web and longitudinally extending recess is arranged on the slats or in the elastomeric matrix, or in a combination thereof, it will result in a continuous carrying surface when the conveyor systems units are arranged one after another as stated above into an endless conveyor system.

In another embodiment, a side wall portion of the supporting side wall of the first slat has a protruding web, and a side wall portion of the supporting wall of the second slat has a corresponding recess.

In another embodiment, the elastomeric matrix wall has a protruding web along a side wall portion of a supporting side wall of the first slat and has a corresponding recess along a side wall portion of a supporting side wall of the second slat.

In another embodiment, the protruding web may be formed in elastomeric matrix wall along a side wall portion of the supporting side wall of the first slat, while the corresponding recess is formed by a side wall portion of the supporting side wall of the second slat in combination with an end surface of the elastomeric matrix wall not covering the supporting side wall fully along the side wall portion of the supporting side wall of the second slat.

Again, independently if the web and recess is arranged on the supporting side walls, in the elastomeric matrix wall on the supporting side walls or in a combination thereof, it will result in a continuous wall surface when the conveyor system units are arranged one after another as stated above into an endless conveyor system.

In one embodiment, each conveyor system unit comprises a modular system. The modular system comprises a slat unit, two pairs of supporting side walls and two elastomeric matrix walls.

The slat unit comprises the first slat (11) and the second slat (12) forming a pair of slats, each slat (11, 12) being a cross bar having a T-shaped cross section, wherein each upper flat rectangular portion of the T-shaped cross bars (11, 12) forms the supporting surface (13);

As disclosed above, the first slat and the second slat, each in form of a cross bar having a T-shaped cross section, are arranged side by side in view of each other with a first long side edge portion of the first slat facing a second long side edge portion of the second slat, and the first and second slats are interconnected by an elastomeric matrix extending across the supporting surfaces of the first and second slats, and the elastomeric matrix comprises a connecting portion extending between the first and second slats thereby forming a continuous carrying surface of the conveyor system unit, which connecting portion forms a hinged connection between the first and second slats. Again, the elastomeric matrix is fastened to the pair of slats.

The two pairs of supporting side walls are configured to be releasable attached to the short side edges of the first and second slats, and each supporting side wall has a supporting member. Again, as disclosed above, the supporting side walls are configured to extend upwards above the supporting surfaces of each slat.

Concerning the two elastomeric matrix wall units, each elastomeric matrix wall unit comprises two elastomeric matrix wall parts configured to cover and be releasable attached to two supporting side walls configured to be arranged on the same short edge side of the slat unit. The two elastomeric matrix wall parts are interconnected by a connecting wall portion being foldable, and wedge shaped with an acute angle configured to be arranged facing the continuous carrying surface of the slat unit. This connecting wall portion forms a hinged connection between the elastomeric matrix wall parts.

In one embodiment of this modular system, the connecting portion between the long side edge portions of the first and second slats comprises a longitudinally extending recess, the longitudinally extending recess forming part of the hinged connection between the first and second slats. This longitudinally extending recess is arranged in a surface opposite to the continuous carrying surface of the slat unit.

Concerning the connecting portion between the long side edge portions of the first and second slats in form of a longitudinally extending recess, such a longitudinally extending recess may be arced formed or have a triangular cross-section. Other geometrical cross-sections are also possible, as long as the longitudinally extending recess allows the two slats to be pivotably moved in relation to each other when passing a pulley position.

When the modular system is assembled into a conveyor system unit, the different features of the different embodiments disclosed above are equally applicable to this modular system.

In line with the embodiments disclosed above, the elastomeric matrix on the slat unit may have a longitudinally extending protruding web along a second long side edge portion of the first slat and may have a corresponding longitudinally extending recess along a first long side edge portion of the second slat. Thus, when a plurality of modular conveyor system units are arranged side by side into an endless conveyor system on a pair of endless chains, with a modular conveyor system unit bridging the pivotable joint in the chain link, and a consecutive modular conveyor system unit being arranged with a support member of a supporting side wall attached to the first slat connected to the same chain link as a support member of a supporting side wall attached to the second slat of a preceding modular conveyor system unit, the longitudinally extending protruding web and corresponding longitudinally extending recess are aligned thereby form a continuous carrying surface of the endless conveyor system.

Again, in line with the embodiments disclosed above, another embodiment of the modular conveyor system unit comprises a side wall portion of a supporting side wall intended to be mounted to a first slat has a protruding web, and a side wall portion of the supporting side wall intended to be mounted to the second slat has a corresponding recess.

Also in line with the embodiments disclosed above, another embodiment of the modular conveyor system unit comprises a side wall portion of a first elastomeric matrix wall part of an elastomeric matrix wall unit having a protruding web, and a side wall portion of a second elastomeric matrix wall part of that elastomeric matrix wall unit having a corresponding recess.

Again, when the modular conveyor system units are arranged one after the other on a pair of endless chains as discussed above, it will result in a continuous elastomeric matrix wall surface.

Alternative arrangements of the protruding webs and corresponding recesses according to earlier disclosed embodiments are also equally applicable to the modular conveyor system unit.

In one embodiment, the support members are arranged on the supporting side walls offset from the continuous carrying surface of the conveyor system unit. By the term of "offset" is meant a position higher than the continuous carrying surface as seen in a carrying mode for the conveyor system unit. With this position, the continuous carrying surface is not aligned with the endless chains, and instead the continuous carrying surface is arranged on a lower level in comparison with the endless chains in a carrying mode. Thus, when the endless conveyor system travels over the pulley, the point of rotation along the slates are lower than the point of rotation of the endless chains.

In one embodiment, the elastomeric matrix material of the elastomeric matrix and/or the elastomeric matrix walls is selected from reinforced elastomeric material, rubber, polyurethane, or any other appropriate material that may withstand abrasion of the materials or goods to be carried by the conveyor system units.

In one embodiment, the elastomeric matrix and the elastomeric matrix walls are fastened to the pair of slats and to the supporting side walls, respectively, by vulcanization. In another embodiment, the elastomeric matrix and the elastomeric matrix walls are fastened by clamping.

However, in other embodiments, the elastomeric matrix and the elastomeric matrix walls may also be fastened by aid of melt bonding, adhesive, cold welding or by mechanical fastening, like screwing, bolting or by use of Velcro. A combination of two or more of these fastening methods may also be used for each conveyor system unit.

According to a second aspect of the disclosure, these and other objects are also achieved, in full or at least in part, by an endless conveyor system comprising a pair of endless chains and a plurality of conveyor system units according to any one or combination of one or more of the above identified embodiments of the conveyor system units. According to this second aspect, the conveyor system units are arranged side by side to form an endless conveyor system, wherein a support member of a supporting side wall on a first slat of a first conveyor system unit is connected to a first chain link of one of the endless chains, and a support member of a support side wall on a second slat of the first conveyor system unit is connected to a consecutive second chain link in the endless chain. Further, a support member of a supporting side wall on a first slat of a consecutive conveyor system unit is connected to the second chain link of the endless chain, and a support member of a supporting side wall on a second slat of the consecutive conveyor system unit is connected to a consecutive third chain link in the endless chain.

Again, with such conveyor system units forming the endless conveyor system, individual conveyor system units may be replaced independently of each other upon rupture, wear, or other affects, like chemical contamination. With the possibility of independent replacement, the down time for the conveyor system during exchange is reduced. Further, such an endless conveyor system enables use of scrapers also for the side walls, and not only for the continuous carrying surface of the endless conveyor system. Even further, such an endless conveyor system is applicable for heavy duty applications as well as for applications where there are significant fines present in the feed, as the structure thereof ensures minimal leakage and at the same time provide a structure to allow heavy load.

According to one embodiment of this second aspect, a longitudinally extending protruding web along a long side edge portion of the first conveyor system unit is received in a longitudinally extending recess along a long side edge portion of the consecutive conveyor system unit, thereby forming a continuous carrying surface of the endless conveyor system.

According to another embodiment of this second aspect, a protruding web along a side wall portion of a supporting side wall of the first conveyor system unit is received in a recess along a side wall portion of a supporting side wall of the consecutive conveyor system unit, thereby forming a continuous wall surface of the endless conveyor system.

According to one embodiment of this second aspect, a load distributing plate is connected to and arranged to bridge over two support members arranged on a common chain link. Such a load distributing plate will ensure alignment of the two support members on the common chain link and will also distribute any uneven load on the continuous carrying surfaces of the aligned two conveyor system units.

In one embodiment the load distributing plate is enforced with a ridge arranged in the chain link direction.

Other objectives, features and advantages of the present disclosure will appear from the following detailed disclosure, from the attached claims, as well as from the drawings. It is noted that the disclosure relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise.

As used herein, the term "comprising" and variations of that term are not intended to exclude other additives, components, integers or steps.

BRIEF DESCRIPTION OF THE DRAWINGS

The disclosure will be described in more detail with reference to the appended schematic drawings, which show examples of presently preferred embodiments of the disclosure.

FIG. 1a is a perspective view of one embodiment of a conveyor system unit according to the present disclosure.

FIG. 1b is a cross-sectional view of the embodiment shown in FIG. 1a.

FIG. 11 is a cross-sectional view of the embodiment shown in FIG. 10.

FIG. 12a is a partly exploded view of the embodiment shown in FIG. 10, and FIG. 12b is an enlargement of one part of the embodiment shown in FIG. 10.

FIG. 14 is a perspective view of a part of an endless conveyor system with thereon arranged conveyor system units.

FIG. 15 is a perspective view of the endless conveyor system shown in FIG. 14 shown from another angle.

DETAILED DESCRIPTION

Figure 2:
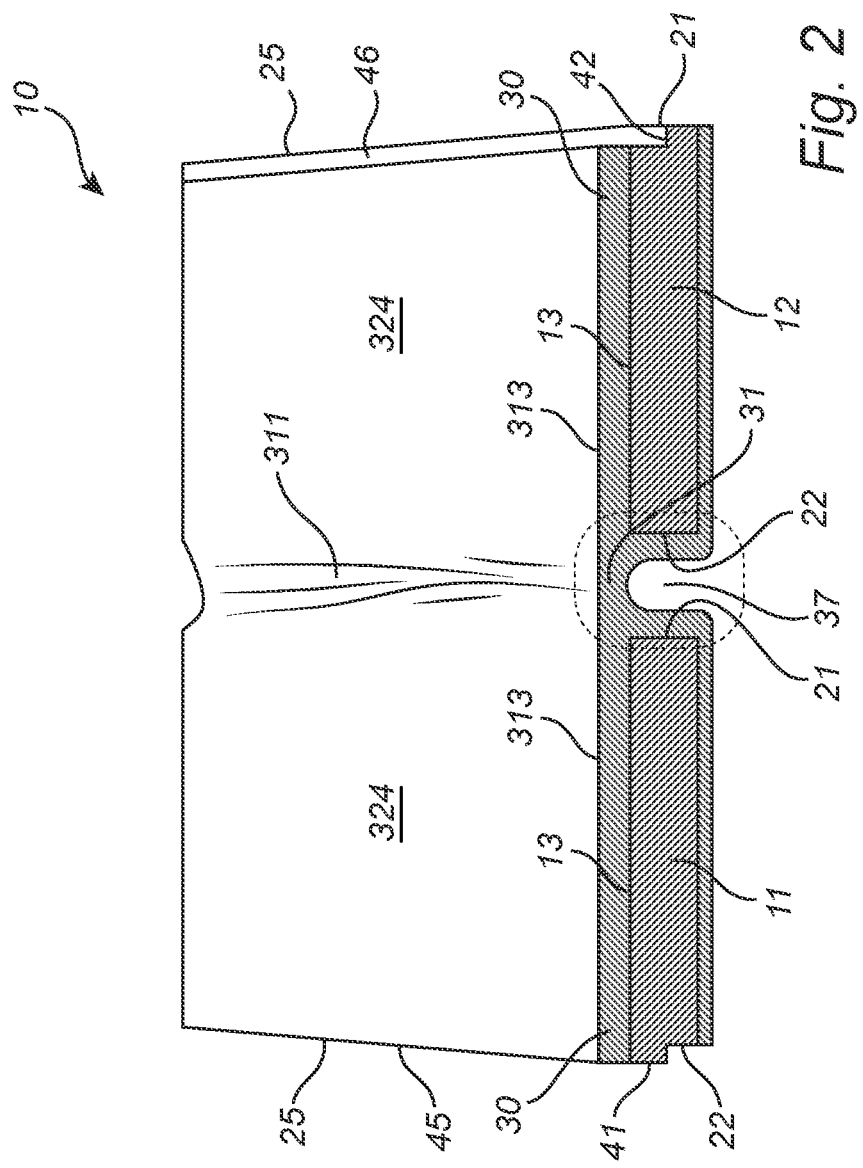
FIG. 2 is a cross-sectional view of another embodiment of a conveyor system unit according to the present disclosure.

The present disclosure will now be described more fully hereinafter with reference to the accompanying drawings, in which currently preferred embodiments of the disclosure are shown. The present disclosure may, however, be embodied in many different forms and should not be construed as limited to the embodiments set forth herein; rather, these embodiments are provided for thoroughness and completeness, and to fully convey the scope of the disclosure to the skilled addressee. Like reference characters refer to like elements throughout.

FIGS. 1a-b show a conveyor system unit 10 according to one embodiment of the present disclosure, which conveyor system unit 10 is configured to form part of an endless conveyor system 50. The conveyor system unit 10 is shown in a flat configuration and comprises a first slat 11 and a second slat 12 together forming a pair of slats. Each slat 11, 12 has a supporting surface 13 configured to carry the load of the endless conveyor system 50. The supporting surface 13 has a first long side edge portion 21, a second long side edge portion 22, and two short side edge portions 23. The first and second long side edge portions 21, 22 being longer than the two short side edge portions 23, and the first and second long side edge portions 21, 22 and the two short side edge portions 23 together define a rectangular supporting surface 13.

In the conveyor system unit 10, the first and second slats 11, 12 are arranged side by side in view of each other with a first long side edge portion 21 of the first slat 11 facing a second long side edge portion 22 of the second slat 12, and the first and second slats 11, 12 are interconnected by an elastomeric matrix 30 extending across the supporting surfaces 13 of the first and second slats 11, 12. Thus, the elastomeric matrix 30 joins the two slats together. Between the pair of slats 11, 12 the elastomeric matrix 30 forms a connecting portion 31, which extends from the first slat 11 to the second slat 12 forming a hinged connection between the first and second slats 11, 12. Thus, the elastomeric matrix 30 thereby forms a continuous carrying surface 313 of the conveyor system unit 10.

In this embodiment, the elastomeric matrix 30 is fastened onto the first and second slats 11, 12 by vulcanization during manufacturing thereof. However, in other embodiments the elastomeric matrix may be fastened by aid of clamping, melt bonding, adhesive, cold welding or by mechanical fastening, like by screwing, by bolting or by use of Velcro.

At each short side edge portion 23 of the first and second slats 11, 12 a supporting side wall 24 is arranged. These side walls 24 are arranged to extend upwards above the supporting surfaces 13 of each slat 11, 12. Further, the supporting side walls 24 arranged on a same short edge side of the conveyor system unit 10 are interconnected by an elastomeric matrix wall 324 extending across the supporting side walls 24, and the elastomeric matrix wall 324 further comprises a connecting wall portion 311 extending between the supporting side walls 24 arranged on the same short edge side of the conveyor system unit 10, thereby forming a continuous side wall at each short edge side of the conveyor system unit 10, wherein the connecting wall portion 311 forms a hinged connection between the supporting side walls 24 at each short edge side of the conveyor system unit 10.

The elastomeric matrix walls 324 may also be fastened to the supporting side walls by vulcanization during manufacturing thereof. However, in other embodiments the elastomeric matrix walls 324 may be fastened by aid of clamping, melt bonding, adhesive, cold welding or by mechanical fastening, like by screwing, by bolting or by use of Velcro.

The supporting side walls 24 have, on a surface opposite to the elastomeric matrix walls, support members 27 arranged thereon. These support members 27 are configured to be mounted to a pair of endless chains 51, as shown in e.g. FIG. 6, wherein a first support member 27 of the first slat 11 is connected to a first chain link 52 and a support member 27 of the second slat 12 in the same conveyor system unit 10 is connected to a consecutive chain link 53 in the endless chain 51. The connecting portion 31 and the connecting wall portion 311 bridge over the pivot link 58 between the first and the second chain link 51, 52, and when the conveyor system units 10 reach a pulley position, the connecting portion 31 and the connecting wall portion 311 allows a pivot movement in the hinged connection. This is shown in more detail in FIGS. 5-10.

In the embodiment shown in FIG. 1a, the connecting wall portion 311 comprises a flexible and foldable wedge-shaped part with an acute angle facing the continuous carrying surface 313, of the conveyor system unit 10. When the conveyor system unit 10 travels along a flat part of the endless conveyor system path, the connecting wall portion 311 is folded together as shown in FIG. 1a, and when the conveyor system unit 10 reach the pulley position of the endless conveyor system path, the connecting wall portion 311 is stretched to form a continuous wall with the elastomeric matrix wall 324 on the supporting side walls 24 of the first and second slats 11, 12, as shown in FIGS. 6-9.

In the conveyor system unit 10 shown in FIG. 1a, the connecting portion 31 arranged between the long side edge portions 21, 22 of the first and second slats 11, 12 comprises a longitudinally extending recess 37. In the embodiment shown in FIG. 1a, this longitudinally extending recess 37 is arranged as an arced longitudinally extending recess 37 in the elastomeric matrix 30 between the pair of slats 11, 12. However, this longitudinally extending recess 37 may have other forms also. In the embodiment shown in FIG. 3, the longitudinally extending recess 37 has a triangular cross-section. Other geometrical cross-sections are also possible, as long as the longitudinally extending recess 37 allows the first and second slats 11, 12 to be pivotably moved in relation to each other when passing the pulley position. Again, as stated earlier, the connecting portion does not necessarily have to comprise a longitudinally extending recess, instead the elastomeric matrix may be made of a material flexible enough to allow bending in the connecting portion between the first and second slats.

Figure 3:
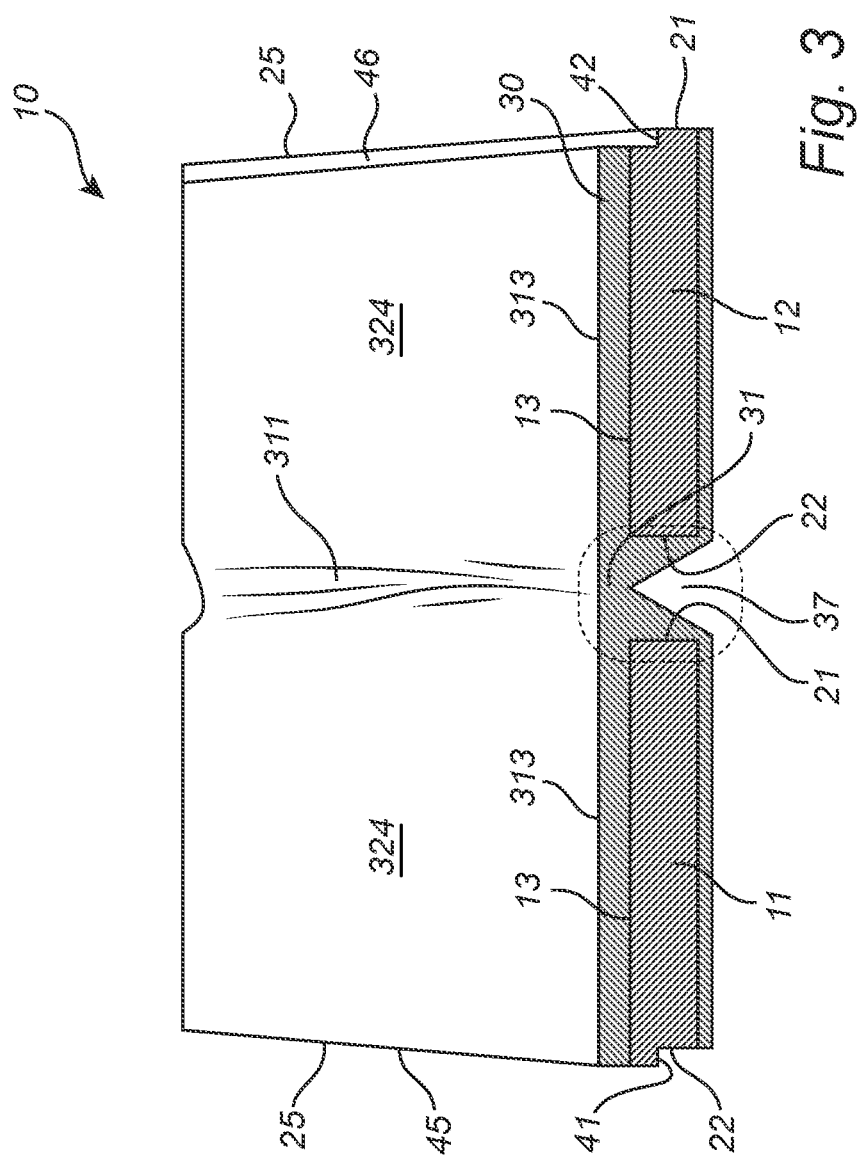
FIG. 3 is a cross-sectional view of another embodiment of a conveyor system unit according to the present disclosure.
Figure 4:
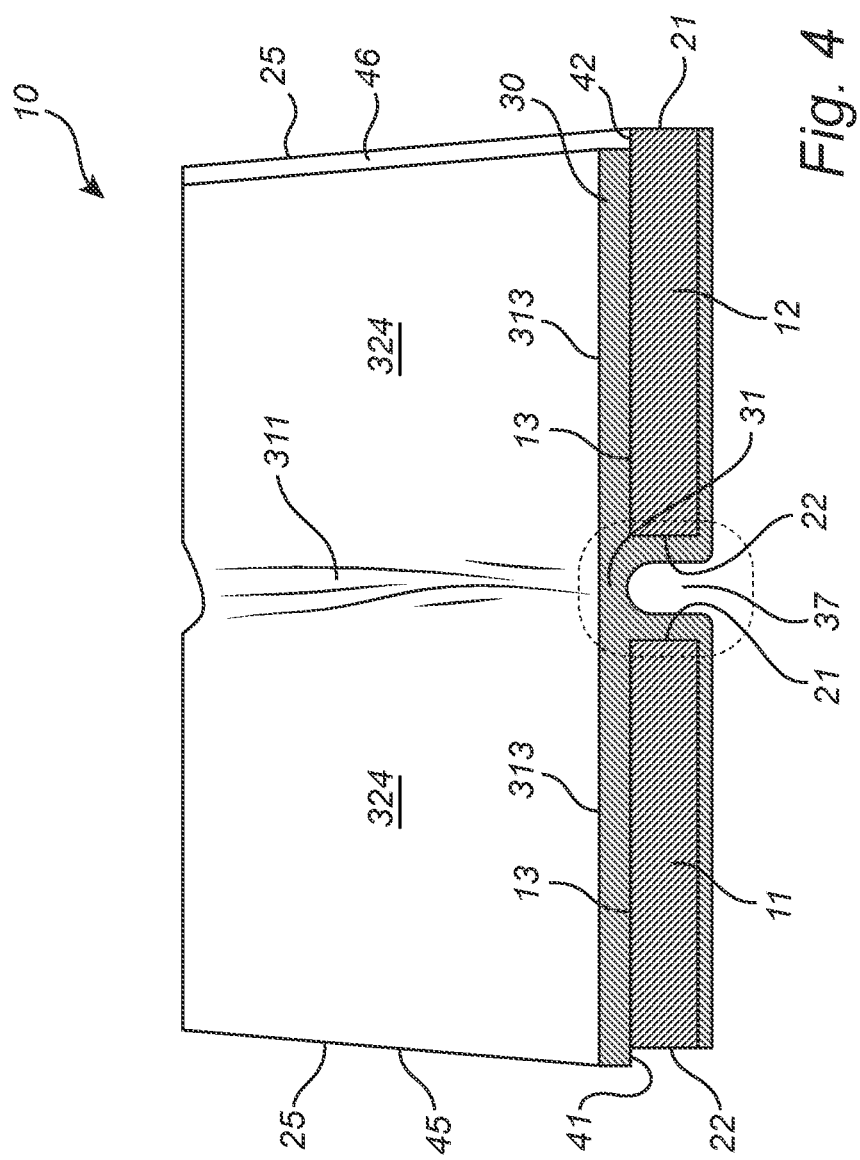
FIG. 4 is a cross-sectional view of another embodiment of a conveyor system unit according to the present disclosure.

A cross-sectional view of the conveyor system unit 10 shown in FIG. 1a is shown in FIG. 1b. FIG. 1b further shows that the conveyor system unit 10 has a longitudinally extending protruding web 41 arranged on a second long side edge portion 22 of the first slat 11 and has a corresponding longitudinally extending recess 42 along a first long side edge portion 21 of the second slat 12. In the embedment of FIG. 1b, the longitudinally extending protruding web 41 and the corresponding longitudinally extending recess 42 is formed in the elastomeric matrix 30. However, the longitudinally extending protruding web 41 and the longitudinally extending corresponding recess 42 may in another embodiment be formed in the first and second slats 11, 12 as shown in FIG. 2 and FIG. 3. In another embodiment, the longitudinally extending protruding web 41 may be formed in the elastomeric matrix 30, while the corresponding longitudinally extending recess 42 is formed by the supporting surface 13 of the slat 12 in combination with an end surface of the elastomeric matrix 30 not covering the supporting surface 13 fully along a first long side edge portion 21 of the second slat 12, as shown in FIG. 4.

The conveyor system unit 10 shown in FIG. 1a-b further has a protruding web 45 along a side wall portion 25 of a supporting side wall 24 arranged on a first slat 11, and a corresponding recess 46 along a side wall portion 25 of a supporting side wall 24 arranged on the second slat 12. Again, the protruding web 45 and the corresponding recess 46 may be arranged in the elastomeric matrix wall 324 on the supporting side walls 24 as shown in FIG. 1b, or may be arranged in the supporting side wall 24, or may even comprise a protruding web 45 in the elastomeric matrix wall 324 and a corresponding recess 46 formed by a supporting side wall 24 on the second slat 12 in combination with an end surface of the elastomeric matrix wall 324 on the supporting side wall 24 not covering the supporting side wall 24 fully towards the side wall portion 25 of the supporting side wall 24.

Thus, when two conveyor system units 10 are arranged side by side on a pair of endless chains 51, the protruding webs 41, 45 of a one conveyor system unit 10 will align the corresponding recesses 42, 46 of a adjacent conveyor system units 10, and form a continuous carrying surface 313 and continuous wall surfaces of the endless conveyor system 50.

The webs 41, 45 do not necessarily have to be arranged on the same side of the conveyor system unit 10. Instead, the longitudinally web 41 may be arranged along a second long side edge portion 22 of a first slat 11, while the web 45 may be arranged on a side portion 25 of a supporting side wall 24 arranged on the second slat 12. With this arrangement, the longitudinally recess 42 will be arranged along a first long side edge portion 21 of a second slat, and the recess 46 will be arranged on a side portion 25 of a supporting side wall 24 arranged on the first slat 11.

Figure 5:
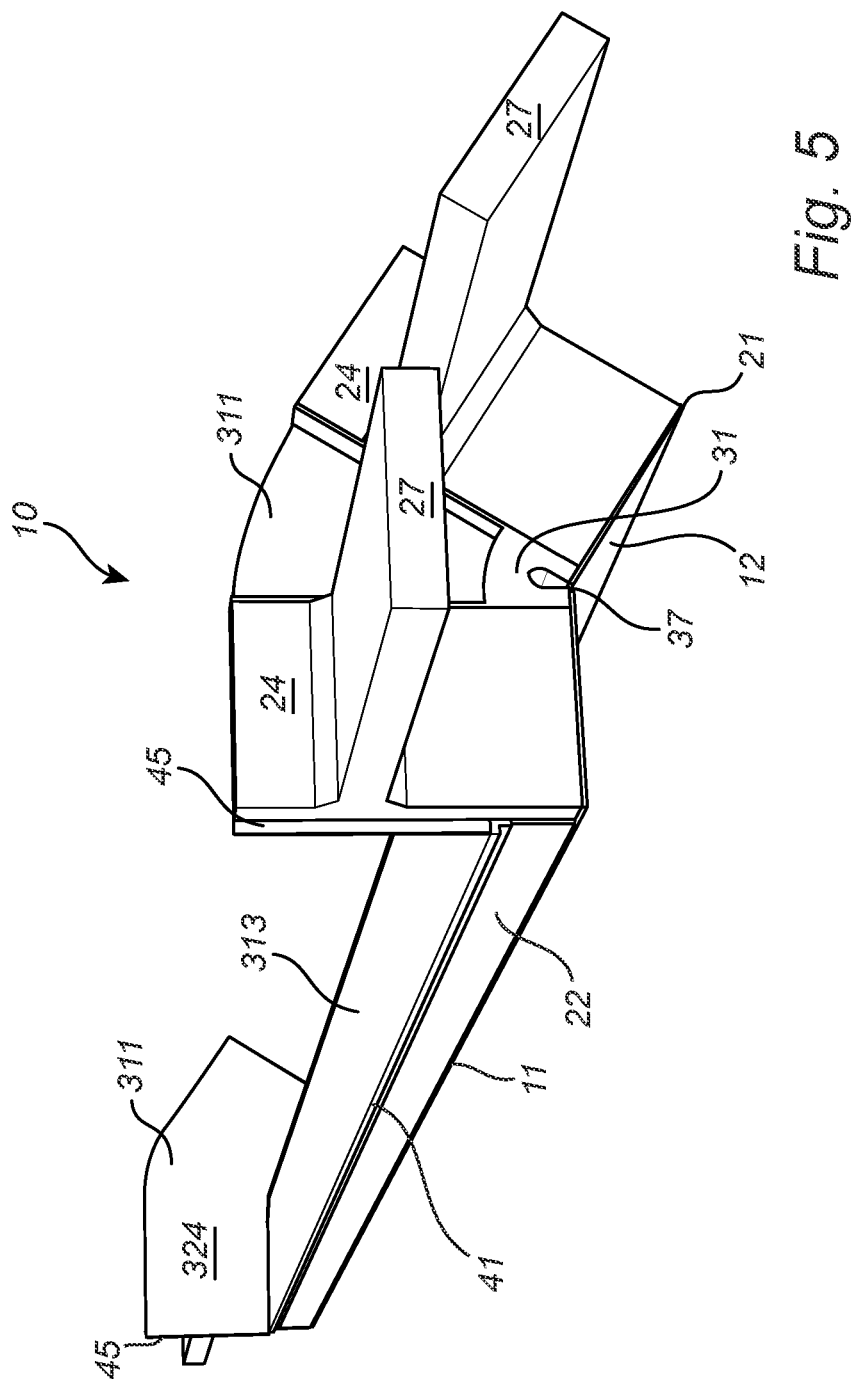
FIG. 5 is a perspective view of one embodiment of a conveyor system unit according to the present disclosure shown in a bent position like when passing the pulley position in an endless conveyor system arrangement.

FIG. 5 is a perspective view of the embodiment of a conveyor system unit 10 of FIG. 1a shown in a bent position when like passing a pulley position in an endless conveyor system arrangement. As shown in FIG. 5, the connecting wall portion 311 is now stretched out and forms a continuous smooth side wall together with the elastomeric matrix wall 324 on the supporting side walls 24 of the first and second slats 11, 12, while the connecting portion 31 is bent like a hinge between the first and second slats 11, 12.

Figure 6:
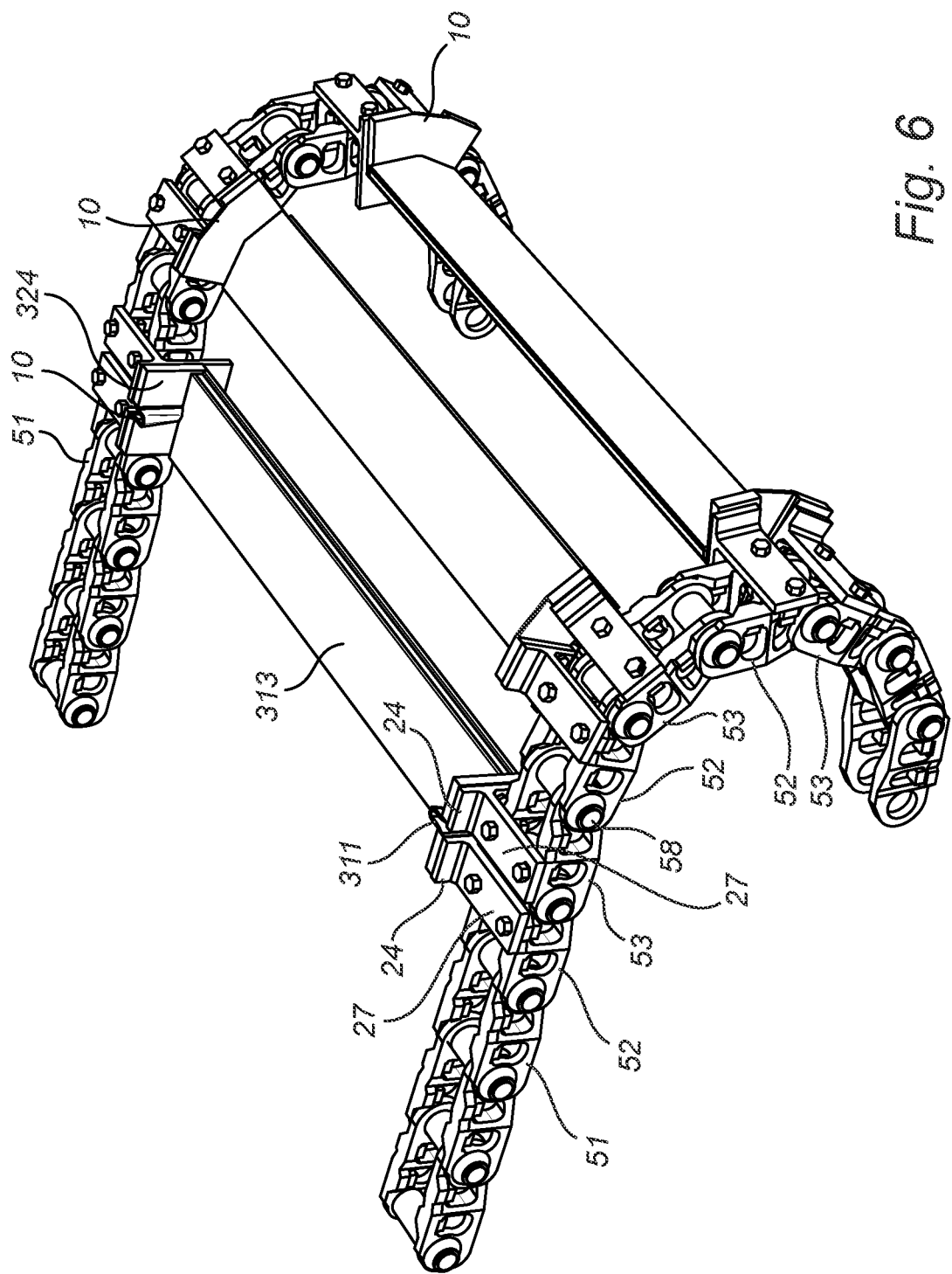
FIG. 6 is a perspective view of a part of an endless conveyor system with three thereon arranged conveyor system units according to one embodiment of the present disclosure.

As shown in FIG. 6, in which three conveyor system units 10 have been arranged on a pair of endless chains 51 with space for intermediate conveyor system units 10, the connecting portions 31 and the connecting wall portions 311 are arranged to bridge over a pivot link 58 between two consecutive chain links 52, 53, and when the endless conveyor system 50 travels over the pulley position, each conveyor system unit 10 is bent between the first and second slats 11, 12.

Figure 7:
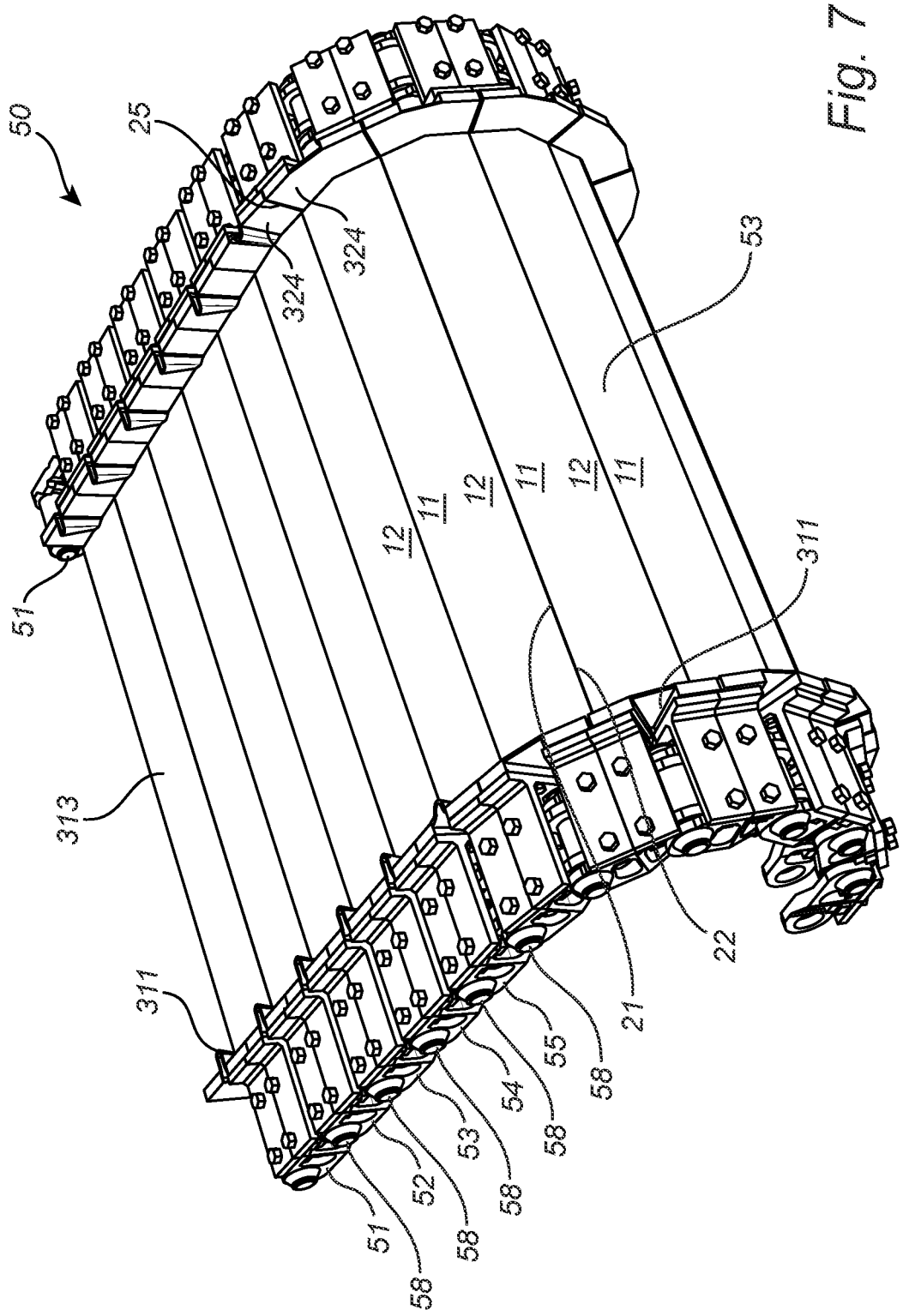
FIG. 7 is a perspective view of a part of an endless conveyor system with thereon arranged conveyor system units according to one embodiment of the present disclosure.
Figure 8:
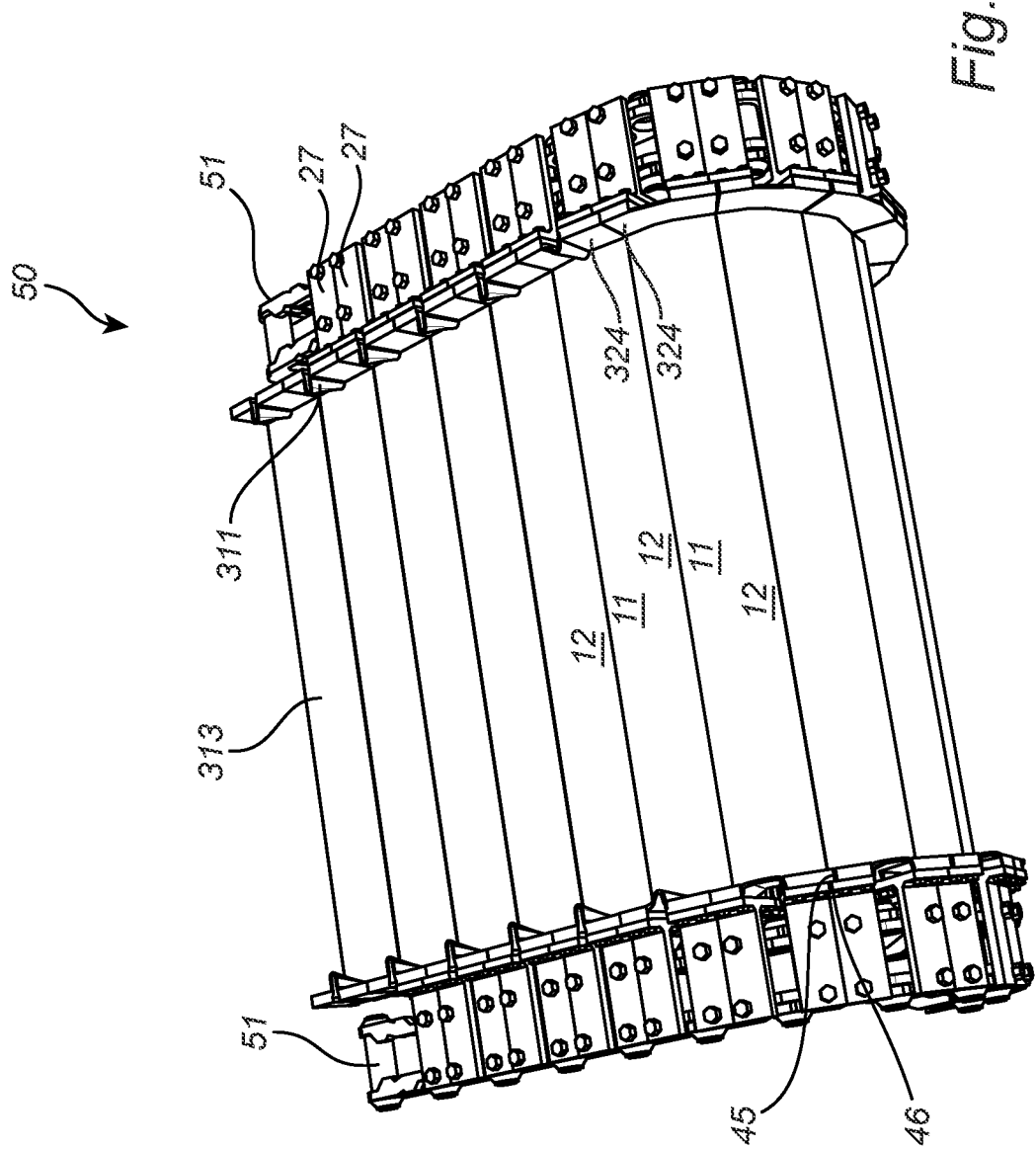
FIG. 8 is a perspective view of the endless conveyor system shown in FIG. 7 shown from another angle.

FIGS. 7 and 8 show how multiple conveyor system units 10 are arranged one after the other on a pair of endless chains 51. Again, it is shown how first and second slats 11, 12, in each conveyor system unit 10, are pivoted in relation to each other when passing a pulley position, while a first long side edge portion 21 of a second slat 12 in a first conveyor system unit 10 is kept aligned with a second long side edge portion 22 of the first slat 11 in a consecutive conveyor system unit 10, wherein a longitudinally extending protruding web 41 of the second slat 12 in the first conveyor system unit 10 is received in the corresponding longitudinally extending recess 42 in the first slat 11 of the consecutive conveyor system unit 10 to form a continuous carrying surface 313 of the elastomeric matrix 30, as these slats are arranged on a common chain link. In the same way a protruding web 45 along a side wall portion 25 of a supporting side wall 24 of a second slat 12 in a first conveyor system unit 10 is received in the corresponding recess 46 along a side wall portion 25 of a supporting side wall 24 of a first slat 11 of the consecutive conveyor system unit 10 to form a continuous side wall surface.

Figure 9:
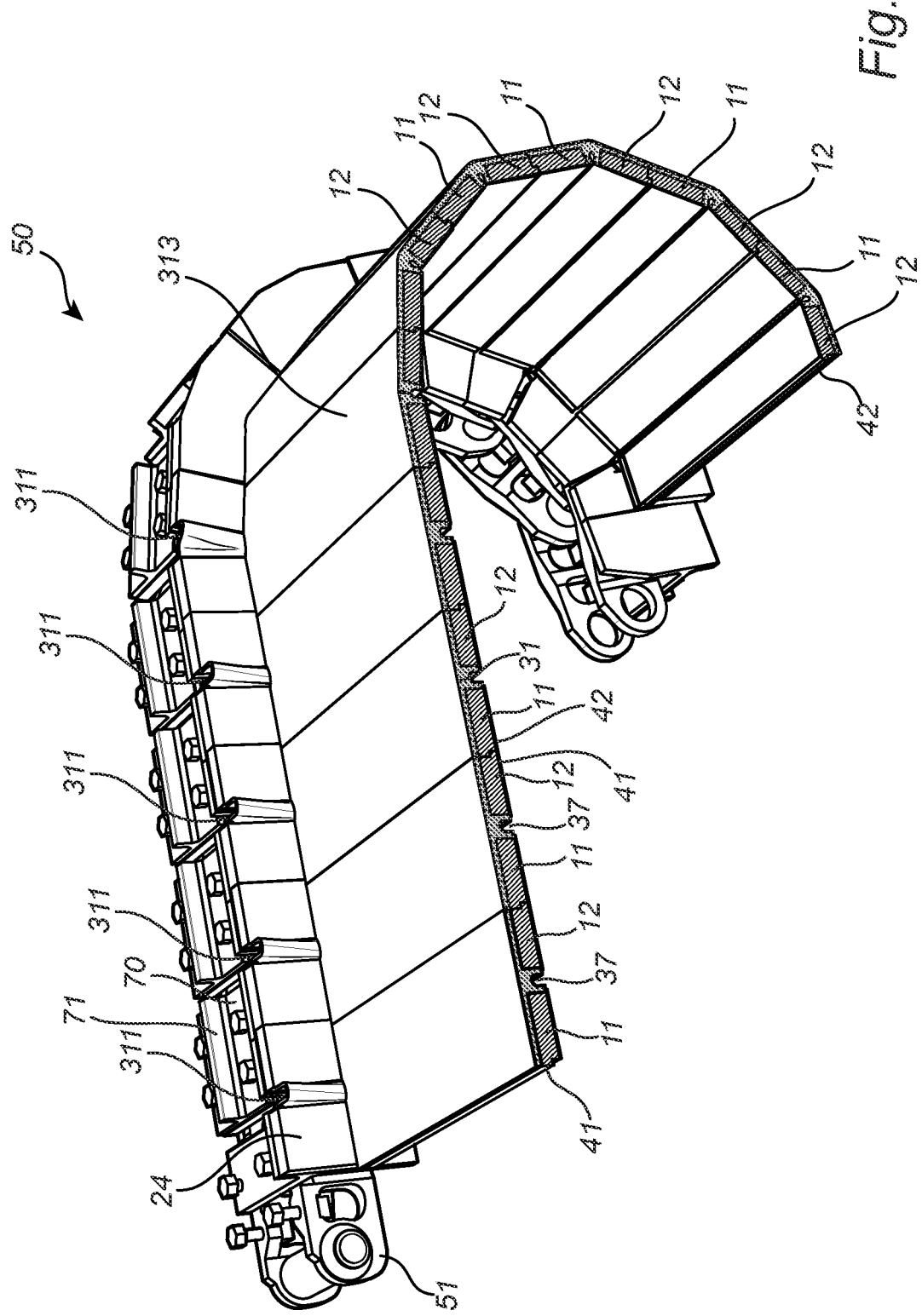
FIG. 9 is a perspective cross-sectional view of the endless conveyor system.

FIG. 9 is a perspective cross-sectional view of the endless conveyor system 50 according to one embodiment of the disclosure, which show a longitudinally extending recess 42, and a longitudinal extending web 41 arranged in the material of the first slat 11 and second slat 12, respectively. The endless conveyor system 50 further has load distributing plates 70, which each is arranged to bridge over two support members 27 of two different conveyor system units 10 arranged on a common chain link 52, 53, 54, 55. The load distributing plates 70 are fastened to the endless chains 51 with the supporting members 27 arranged therein between by way of bolting. Each load distributing plate 70 may further have an enforcement ridge 71 arranged in the chain link direction.

FIGS. 10-15 show a conveyor system unit according to another embodiment of the present disclosure. In this embodiment the conveyor system unit 10, comprises a modular system. As shown in FIG. 12a, the modular system comprises a slat unit 60, two pair of supporting side walls 24, and two elastomeric matrix walls 324'.

The slat unit 60 comprises the first slat 11 and the second slat 12 forming a pair of slats, each slat 11, 12 being a cross bar having a T-shaped cross section. Each upper flat rectangular portion of the cross bars 11, 12 forms the supporting surface 13 of each cross bar or slat 11, 12. In the slat unit 60, the first and second slats 11, 12 are arranged side by side in view of each other with a first long side edge portion 21 of the supporting surface 13 of the first slat 11 facing a second long side edge portion 22 of the supporting surface 13 of the second slat 12, and the first and second slats 11, 12 are interconnected by an elastomeric matrix 30 extending across the supporting surfaces 13 of the first and second slats 11, 12. The elastomeric matrix 30 further comprises a connecting portion 31 extending between the first and second slats 11, 12, thereby forming a hinged connection between the first and second slats 11, 12. In the embodiment shown in FIGS. 10-15, the connecting portion 31 comprises a longitudinally extending recess 37, which may have an arced cross section or a triangular cross-section. Other geometrical cross-sections are also possible, as long as the longitudinally extending recess 37 allows the first and second slats 11, 12 to be pivotably moved in relation to each other. Again, the connecting portion does not necessarily have to comprise a longitudinally extending recess, instead the elastomeric matrix may be made of a material flexible enough to allow bending in the connecting portion between the first and second slats.

The two pairs of supporting side walls 24 are configured to be releasable attached to the short side edges 23 of the first and second slats 11, 12, and especially to the vertical part of the cross bars 11, 12 with a T-shaped cross section. Further in this embodiment, each supporting side wall 24 has a support member 27 arranged thereon, which support member 27 is arranged on the supporting side wall 24 on a surface configured to face away from the continuous carrying surface 313 of the slat unit 60, thus being arranged on a surface opposite to where the elastomeric matrix walls are attached.

As shown in detail in FIG. 12b, each elastomeric matrix wall 324' comprises two elastomeric matrix wall parts 327 configured to cover and be releasable attached to two supporting side walls 24, which supporting side walls 24 are configured to be arranged on the same short edge side of the slat unit 60. The elastomeric matrix wall parts 327 are interconnected by a connecting wall portion 311 being flexible, foldable and wedge shaped and having an acute angle configured to be arranged facing the continuous carrying surface 313 of the slat unit 60. This connecting wall portion 311 forms a hinged connection between the elastomeric matrix wall parts 237.

Figure 13:
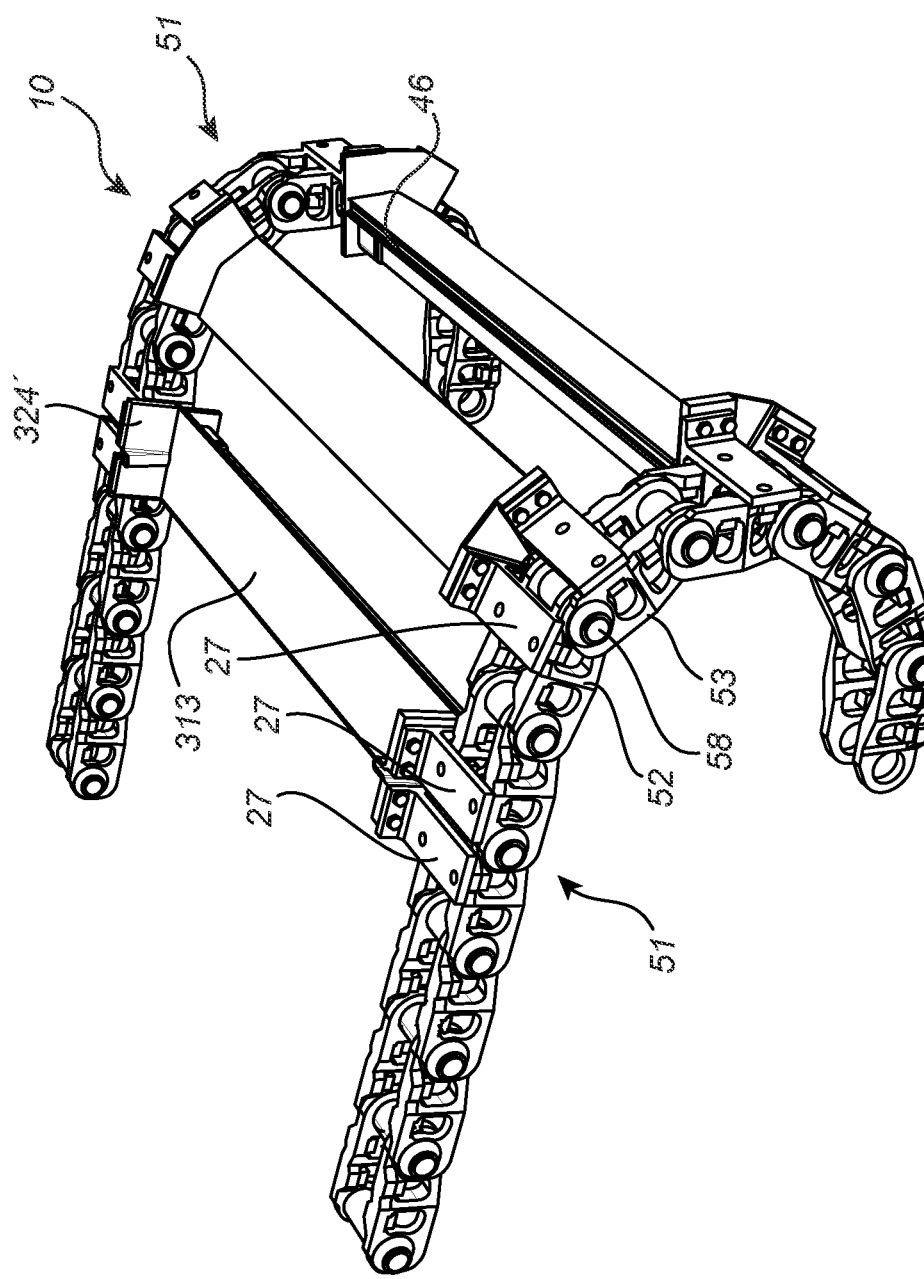
FIG. 13 is a perspective view of a part of an endless conveyor system with three thereon arranged conveyor system units according to the embodiment shown in FIG. 10.

When the modular system is assembled into a conveyor system unit 10, it is used and assembled to a pair of endless chains 51 in the same way as the embodiments disclosed above. Thus, the support members 27 are mounted to a pair of endless chains 51, as shown in FIG. 13-15, wherein a first support member 27 of a supporting side wall 24 attached to the first slat 11 is connected to a first chain link 52 and a support member 27 of a supporting side wall 24 attached to the second slat 12 is connected to a consecutive chain link 53 in the endless chain 51. The connecting portion 31 and the connecting wall portion 311 of the conveyor system unit 10 bridges over the pivot link 58 between the first and the second chain link 51, 52, and when the conveyor system units 10 reach a pulley position, the connecting portion 31 and the connecting wall portion 311 allow a pivot movement between the first and second slats 11, 12 and the supporting side walls 24 attached thereto. This is shown in more detail in FIGS. 13-15.

The cross-sectional view of the conveyor system unit 10 shown in FIG. 11 further shows that the conveyor system unit 10 has a longitudinally extending protruding web 41 unit 10 arranged on a first long side edge 21 of the elastomeric matrix of the second slat 12, and a corresponding longitudinally extending recess 42 along a second long side edge portion 22 of the first slat 11. In the embodiment of FIG. 11 the longitudinally extending protruding web 41 and the corresponding longitudinally extending recess 42 is formed in the elastomeric matrix 30. Thus, when two conveyor system units 10 are arranged side by side on a pair of endless chains 51, the longitudinally extending protruding webs 41, of a first conveyor system unit 10 will align with the corresponding recesses 42 of a consecutive conveyor system unit 10 and form a continuous carrying surface 313 for the endless conveyor system 50.

Figure 10:
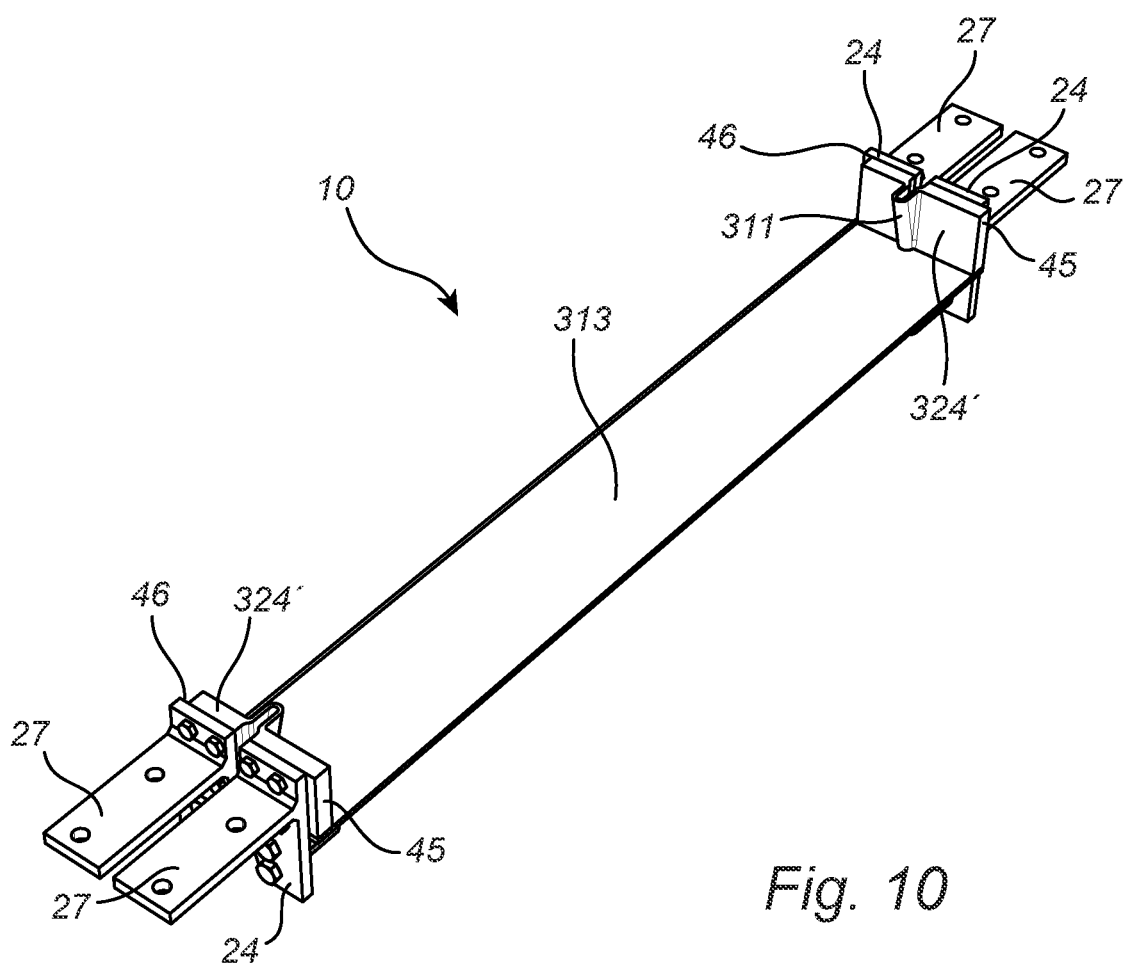
FIG. 10 is a perspective view of another embodiment of a conveyor system unit according to the present disclosure.

The elastomeric matrix wall 324' shown in FIG. 12b seems not to have any protruding web 45 along a side wall portion of a first elastomeric matrix wall part 327, and no corresponding recess 46 along a side wall portion of a second elastomeric matrix wall part 327. However, when mounted to the side walls, it will form a protruding web 45 of the elastomeric matrix in one end, and a corresponding recess 46 will be formed in the other end by a supporting side wall surface and an end surface of the elastomeric matrix wall part 327 not covering the supporting side wall 24 fully towards the side wall portion 25 of the supporting side wall 24, as shown in FIG. 10.

However, alternative arrangements with a protruding web 45 and corresponding recess 46 according to earlier disclosed alternatives as disclosed in relation to in FIGS. 1-4 are also possible for this modular version of the conveyor system unit 10.

In the embodiment shown in FIGS. 10-15, the elastomeric matrix 30 is fastened onto the first and second slats 11, 12 by having the elastomeric matrix 30 clamping around the long side edges 21, 22 of the first and second slats 11, 12. However, it may also be fastened to the first and second slats 11, 12 by vulcanization during manufacturing of the slat unit 60, while the elastomeric matrix walls 324' may be fastened mechanical like screw, or screw and bolt arrangement to the supporting side walls or by Velcro.

As shown in FIG. 13, three conveyor system units 10 have been arranged on a pair of endless chains 51 with space for intermediate conveyor system units 10, the connecting portion 31 and the connecting wall portion 311 are arranged to bridge over a pivot link 58 between two consecutive chain links 52, 53, and when the endless conveyor system 50 travels over a pulley position, each conveyor system unit 10 is bent between the first and second slats 11, 12.

FIGS. 14 and 15 show how multiple conveyor system units 10 are arranged one after the other on a pair of endless chains 51. Again, it is shown how first and second slats 11, 12, in each conveyor system unit 10, are pivoted in relation to each other when passing the pulley position, while the first long side edge portion 21 of the second slat 12 of a first conveyor system unit 10 is align to a second long side edge portion 22 of a first slat 11 in a consecutive conveyor system unit 10 on a common chain link. Again, the protruding webs 41, 45 of each conveyor system unit 10 are received in the corresponding recesses 42, 46 in the adjacent conveyor system units 10 to form a continuous carrying surface 313 of the elastomeric matrix 30, and a continuous elastomeric matrix wall surface.

The endless conveyor systems 50 in FIGS. 13-15 further have load distributing plates 70, which each is arranged to bridge over two support members 27 from two different conveyor system units 10 arranged on a common chain link 52, 53, 54, 55. The load distributing plates 70 are fastened to the endless chains 51 by bolting, with the support members 27 arranged therein between. Each load distributing plate 70 may further have an enforcement ridge 71 arranged in the chain link direction.

The skilled person realizes that several modifications of the embodiments described herein are possible without departing from the scope of the disclosure, which is defined in the appended claims.

For instance, the protruding webs 41, 45 of the second long side edge 22 and the side wall portion 25 of a supporting side wall 24 on the first slat, and the corresponding recesses 42, 46 of the first long side edge 22 and the side wall portion 25 of a supporting side wall 24 on the second slat 12, respectively, may be arranged the other way around or even differently for long side edges 21, 22, and side wall portions 25 of the supporting side walls 24 on the first and second slats 11, 12.

Further, the slats may have other cross-sectional profiles as long as such cross-sectional profile provide a rectangular supporting surface 13 and an end opposite the supporting surface allowing a pivot movement between the slats when passing a pulley position.

The invention claimed is:

1. A conveyor system unit configured to form part of an endless conveyor system, each conveyor system unit comprising:
   a first slat and a second slat together forming a pair of slats, each slat having a supporting surface with a first and a second long side edge portion and two short side edge portions, the first and second long side edge portions being longer than the two short side edge portions, and the first and second long side edge portions and the two short side edge portions together defining a rectangular supporting surface,
   wherein the first and second slats are arranged side by side in view of each other with a first long side edge portion of the first slat facing a second long side edge portion of the second slat, and
   wherein the first and second slats are interconnected by an elastomeric matrix extending across the supporting surfaces of the first and second slats,
   wherein the elastomeric matrix further comprises a connecting portion extending between the first and second slats thereby forming a continuous carrying surface of the conveyor system unit,
   wherein the connecting portion forms a hinged connection between the first and second slats, and
   wherein the elastomeric matrix is fastened to the first and second slats, wherein each conveyor system unit further comprises supporting side walls arranged at each short side edge portion of each slat, which supporting side walls extend upwards above the supporting surfaces of each slat,
   wherein the supporting side walls arranged on a same short edge side of the conveyor system unit are interconnected by an elastomeric matrix wall fastened to and extending across the supporting side walls, and
   the elastomeric matrix wall further comprising a connecting wall portion extending between the supporting side walls arranged on the same short edge side of the conveyor system unit thereby forming a continuous side wall at each short edge side of the conveyor system unit,
   wherein the connecting wall portions form a hinged connection between the supporting side walls at each short edge side of the conveyor system unit.

2. The conveyor system unit according to claim 1, wherein each side wall has a support member, and wherein the conveyor system unit is configured to be mounted to a pair of endless chains by a support member of a supporting side wall on the first slat connecting to a first chain link and a support member of a supporting side wall on the second slat connecting to a consecutive chain link in the endless chain.

3. The conveyor system unit according to claim 1, wherein the connecting wall portion is foldable and wedge shaped with an acute angle facing the continuous carrying surface.

4. The conveyor system unit according to claim 1, wherein the connecting portion between the long side edge portions of the first and second slats, comprises a longitudinally extending recess, the longitudinally extending recess forming part of the hinged connection between the first and second slats.

5. The conveyor system unit according to claim 1, wherein the elastomeric matrix has a longitudinally extending protruding web along a second long side edge portion of the first slat, and a corresponding longitudinally extending recess along a first long side edge portion of the second slat.

6. The conveyor system unit according to claim 1, wherein a side wall portion of the supporting side wall of the first slat has a protruding web, and a side wall portion of the supporting side wall of the second slat has a corresponding recess.

7. The conveyor system unit according to claim 1, wherein the elastomeric matrix wall has a protruding web along a side wall portion of a supporting side wall of the first slat and wherein the elastomeric matrix wall has a corresponding recess along a side wall portion of a supporting side wall of the second slat.

8. The conveyor system unit according to claim 1, wherein each conveyor system unit comprises a modular system, which modular system comprises:
   a slat unit comprising the first slat and the second slat forming a pair of slats, each slat being a cross bar having a T-shaped cross section, wherein each upper flat rectangular portion of the T-shaped cross bars forms the supporting surface;
   two pairs of supporting side walls, which are configured to be releasable attached to the short side edges of the first and second slats, and wherein each supporting side wall has a support member; and
   two elastomeric matrix walls, each elastomeric matrix wall comprising two elastomeric matrix wall parts, each configured to cover and be releasable attached to two supporting side walls configured to be arranged on the same short edge side of the slat unit, the two elastomeric wall parts being interconnected by a connecting wall portion being foldable and wedge shaped with an acute angle configured to be arranged facing the continuous carrying surface of the slat unit, the connecting wall portion forming a hinged connection between the elastomeric matrix wall parts.

9. The conveyor system unit according to claim 8, wherein the connecting portion, between the long side edge portions of the first and second slats, comprises a longitudinally extending recess, the longitudinally extending recess forming part of the hinged connection between the pair of first and second slats.

10. The conveyor system unit according to claim 2, wherein the support members are arranged on the supporting side walls offset from the continuous carrying surface of the conveyor system unit.

11. The conveyor system unit according to claim 1, wherein the elastomeric matrix material of the elastomeric matrix, and/or the elastomeric matrix walls is selected from reinforced elastomeric material, rubber, polyurethane, or any other appropriate material that may withstand abrasion of the materials or goods to be carried by the conveyor system units.

12. An endless conveyor system comprising a pair of endless chains and a plurality of conveyor system units according to claim 1, which conveyor system units are arranged side by side to form an endless conveyor system, wherein a support member of a supporting side wall on a first slat of a first conveyor system unit is connected to a first chain link of one of the endless chains, and a support member of a supporting side wall on a second slat of the first conveyor system unit is connected to a consecutive second chain link in the endless chain, and wherein a support member of a supporting side wall on a first slat of a consecutive conveyor system unit is connected to the second chain link of the endless chain, and a support member of a supporting side wall on a second slat of the consecutive conveyor system unit is connected to a consecutive third chain link in the endless chain.

13. The endless conveyor system according to claim 12, wherein a longitudinally extending protruding web along a long side edge portion of the first conveyor system unit is received in a longitudinally extending recess along a long side edge portion of the consecutive conveyor system unit, thereby forming a continuous carrying surface of the endless conveyor system.

14. The endless conveyor system according to claim 12, wherein a protruding web along a side wall portion of a supporting side wall of the first conveyor system unit is received in a corresponding recess along a side wall portion of a supporting side wall of the consecutive conveyor system unit, thereby forming a continuous wall surface of the endless conveyor system.

15. The endless conveyor system according to claim 12, wherein a load distributing plate is connected to and arranged to bridge over two support members arranged on a common chain link.

* * * * *